Aug. 6, 1974　　　J. FARMER　　　3,827,909
APPARATUS FOR EXTRACTING JUICE FROM SUGAR CANE
Filed June 23, 1971　　　5 Sheets-Sheet 1

Inventor:
John Farmer
By Wilmer Mecklin
his Attorney

Aug. 6, 1974  J. FARMER  3,827,909
APPARATUS FOR EXTRACTING JUICE FROM SUGAR CANE
Filed June 23, 1971  5 Sheets-Sheet 2

Inventor:
John Farmer
By Wilmer Mechlin
his Attorney

Aug. 6, 1974  J. FARMER  3,827,909
APPARATUS FOR EXTRACTING JUICE FROM SUGAR CANE
Filed June 23, 1971  5 Sheets-Sheet 5

FIG. 11

Inventor:
John Farmer
By Wilmer Mechlin
his Attorney 3,827,909
APPARATUS FOR EXTRACTING JUICE
FROM SUGAR CANE
John Farmer, Honolulu, Hawaii, assignor to Ward
Foods, Inc., New York, N.Y.
Filed June 23, 1971, Ser. No. 155,725
Int. Cl. C13d 1/02
U.S. Cl. 127—3          32 Claims

ABSTRACT OF THE DISCLOSURE

Apparatus for extracting juice from sugar cane has one or more downwardly discharging hoppers through which disintegrated cane or bagasse moves by gravity as a column. The bagasse column is subjected within the hopper to diluent liquid for extracting juice by rinsing and displacement, and roll means acting externally on the column control the rate of discharge of the bagasse, while restraining discharge of liquid therewith, and usually will feed the bagasse to a process for extracting additional juice and reducing its liquid content prior to further processing. A screening device at the inlet end of the hopper receives bagasse in the form of a slurry from an associated mixing tank and drains off both slurry liquid and mud and sand before the bagasse is introduced as a solid into the hopper.

BACKGROUND OF THE INVENTION

Juice usually is extracted from sugar cane by milling in which the cane after cleaning is passed through a train of mills arranged in tandem and is crushed in the first and passed as a mat of bagasse through succeeding mills for progressively expressing juice, with maceration or imbibition water or diluent liquid added between mills to improve the extraction. A more recent and now conventional way of extracting the juice has been by diffusion. Since, as opposed to sugar beets, sugar cane does not lend itself to extraction of juice through cell walls by osmosis, the so-called diffusion applied to cane is essentially a rinsing action dependent for efficiency of the extraction on preliminary disintegration by crushing or cutting and shredding to rupture the cell walls. The juice so exposed is extracted by passing the disintegrated mat from one end through a more or less horizontal container in which it is subjected to a counterflow of diluent liquid injected as water into the opposite end.

The most recent way of extracting juice from sugar cane is disclosed in Farmer Pats. Nos. 3,425,869 and 3,432,344, in which previously disintegrated cane is introduced as bagasse into the upper end of a rinsing hopper, through which it is moved by gravity and in process subjected to a plurality of stages of cross-rinsing, in each of which diluent liquid is injected at one level and excess liquid containing juice rinsed from the bagasse is withdrawn at a lower level. In the hopper disclosed in those patents, the bagasse moves as a column, with both the movement through and discharge from the hopper controlled by gravity. The apparatus with which the present invention is concerned is an improvement over that of the Farmer patents.

SUMMARY OF THE INVENTION

An object of the present invention is to provide improved apparatus for extracting juice from sugar cane having a downwardly discharging container wherein previously disintegrated cane is moved by gravity as a column of bagasse and subjected to diluent liquid for extracting juice and the rate of discharge of the bagasse is controlled and discharge of liquid therewith is restrained by roll means acting externally on the column.

Another object of the invention is to provide improved apparatus for extracting juice from sugar cane whereby disintegrated cane is so subjected to diluent liquid as to extract juice therefrom by both rinsing and displacement.

A further object of the invention is to provide improved apparatus for extracting juice from sugar cane wherein disintegrated cane moving by gravity as a column of bagasse through a downwardly discharging container and subjected therein to diluent liquid, is extruded from the container by roll means for temporarily compressing the bagasse presented thereto into a plug substantially impermeable to the passage of liquid, whereby a pool of diluent liquid is formed in the container above the plug for enabling juice to be extracted by displacement from bagasse passed through the pool.

An additional object of the invention is to provide improved juice extraction apparatus having roll means for controlling the rate of discharge of a column of bagasse from an upright container, whereby by projecting the roll means into the column sufficiently to support thereon a substantial part of the weight of the overlying bagasse and correspondingly reducing the area of the opening through which the bagasse is discharged, the pressure exerted by and power required to operate the roll means are also reduced.

Another object of the invention is to provide juice extraction apparatus having an upright container in which disintegrated bagasse moves downwardly by gravity as a column and is subjected to extraction of juice in a plurality of stages at different levels, wherein pinch roll means at the bottom of each stage pinches bagasse moving therepast into a substantially liquid-impermeable layer for separating the stages and restricting to each liquid circulated therethrough.

Another object of the invention is to provide juice extraction apparatus wherein disintegrated bagasse is moved downwardly as a column through and has juice extracted by diluent liquid in an upright container, the container is substantially rectangular and inclined forwardly toward the bottom and transport rolls in the container at the lower rear side of the column prevent the bagasse from bridging and forming slip planes.

A further object of the invention is to provide juice extraction apparatus wherein an upright container in which disintegrated bagasse moving downwardly by gravity as a column is subjected to diluent liquid and a screening device surmounting the container enables bagasse to be pumped thereto as a slurry mixture and drains both excess liquid and sand and mud from the mixture before directing the bagasse in solid form into the container.

Another object of the invention is to provide juice extraction apparatus wherein disintegrated bagasse in moving downwardly by gravity through an upright container is subjected to extraction of juice by diluent liquid in a plurality of stages at different levels, the stages are separated by a substantially liquid-impermeable plug of bagasse formed by pinch rolls at the bottom of each stage and the bagasse in each stage is exposed to diluent liquid in large volume by recirculating the liquid.

Other objects and features of the invention will appear hereinafter in the detailed description, be particularly pointed out in the appended claims and be illustrated in the accompanying drawings, in which:

DETAILED DESCRIPTION

Referring now in detail to the drawings in which like reference characters designate like parts, the improved apparatus of the present invention is designed for extracting juice from sugar cane by subjecting disintegrated cane or bagasse to large volumes of a liquid relatively dilute in juice or sucrose, hereinafter called "diluent liquid," in an action most appropriately termed generally "washing."

The improved apparatus is not only designed for extracting juice from sugar cane, but particularly adapted to cope with the physical properties peculiar to bagasse among juice-containing materials. Bagasse is a mixture of long fiber, loose pith, liquid, air, trash, clay and sand. Of this mixture, the main elements are the solid components of sugar cane, fiber and pith and the fluids, liquid and air, whose presence is essential for mobility, while trash, clay and sand are undesirable minor elements, the relative quantity of which usually is small and depends on the manner in which the cane is harvested and cleaned before being processed for juice.

Depending on its fluid content, bagasse may be in either a fluid or solid state, and in the former, of which a slurry mixture is exemplary, acts as a fluid and can move around almost any obstacle. As discovered in the experiments leading to the present invention, bagasse can have three solid states: one, "springy mat," in which the bagasse is freely permeable and formed of felted fiber, free liquid and air; another, "tight," in which the bagasse is impermeable to liquid and formed of interlocked fiber, bound liquid and reduced air, and the third, "consolidated," in which the bagasse contains very little fluid and is formed of interlocked fiber consolidated with pith, trash, sand and clay, to form an impermeable dense solid body. Both the springy mat and solid states are mobile and in either state the bagasse can be changed to the other or fluidized. However, in the consolidated state bagasse is immobile and neither fluidizable nor otherwise changeable and will assume that state if interrupted in its movement by a solid obstacle.

Also important to the present invention were the following relations or laws discovered to govern the behavior of mobile solid state bagasse when subjected to a liquid:

(1) The rate at which liquid will flow through a bad of bagasse is determined by the least permeable section normal to the direction of flow and a thin, impermeable section of tight bagasse can effectively stop the flow of liquid, while the bagasse on either side of the section remains loose and permeable;

(2) Kirchoff's laws governing the flow of electricity through parallel circuits apply equally to the flow of liquid through a bed of bagasse and liquid will flow in any direction through the bed in inverse proportion to the resistance to flow and directly as the pressure gradient;

(3) The rate of flow through a bed of bagasse is independent of the depth of the bed and is determined entirely by the condition of the bagasse. When the bed is deep, equilibrium betwen the flow rate, the permeability and the effect of gravity on the liquid is reached. The flow through the bed stabilizes and is not affected by the total length of the path of the liquid between inlet and outlet.

Making use of the foregoing discoveries about the states and permeability of the bagasse, the improved apparatus of the present invention is comprised of one or more upright, upstanding or upwardly disposed downwardly discharging containers or hoppers 1 which may be either vertical or, as illustrated, inclined relative to the vertical and obliquely disposed. In either case, bagasse is intended to move downwardly by gravity as a column or mat through the container and in process be washed with diluent liquid for extracting juice and, if the container is obliquely disposed, its inclination or slope must be sufficient relative to the angle of repose of bagasse to produce such movement. Although moved by gravity through the container 1, the bagasse is controlled in its rate of discharge therefrom by one or more discharge rolls 2 adjacent the bottom of the container and acting externally on the bagasse column.

In the improved apparatus, roll means are used not only to control the rate of discharge of the bagasse from the container and thus balance output with input, but also to prevent substantial loss, escape or discharge of liquid from the container with the discharged bagasse. As opposed to liquid bound to the bagasse, the liquid so restrained is free or loose liquid, free to flow or pass through or move relative to the bagasse. This is accomplished by pinching the bagasse column as it moves through the bottom portion of the container into a layer of tight state bagasse for forming thereby a plug impermeable to the passage of free liquid in the container thereabove. While the pinch effect can be produced between a single roll and an opposed side of the container, it usually will be preferred to produce the effect by a pair of opposed rolls mounted in the bottom portion of the container and, as in the illustrated embodiment, these rolls may be the discharge rolls 2. However, whatever the roll means producing the pinch effect, the pressure actually required to change bagasse from the permeable springy mat state required for extraction of juice by washing with diluent liquid and the impermeable tight state is low, but such low pressure is difficult to obtain if the pinch and discharge rolls are the same and, in pinching the bagasse and controlilng its rate of discharge, are subjected to the full force of the overlying bagasse column.

Figures 4, 7, 12:
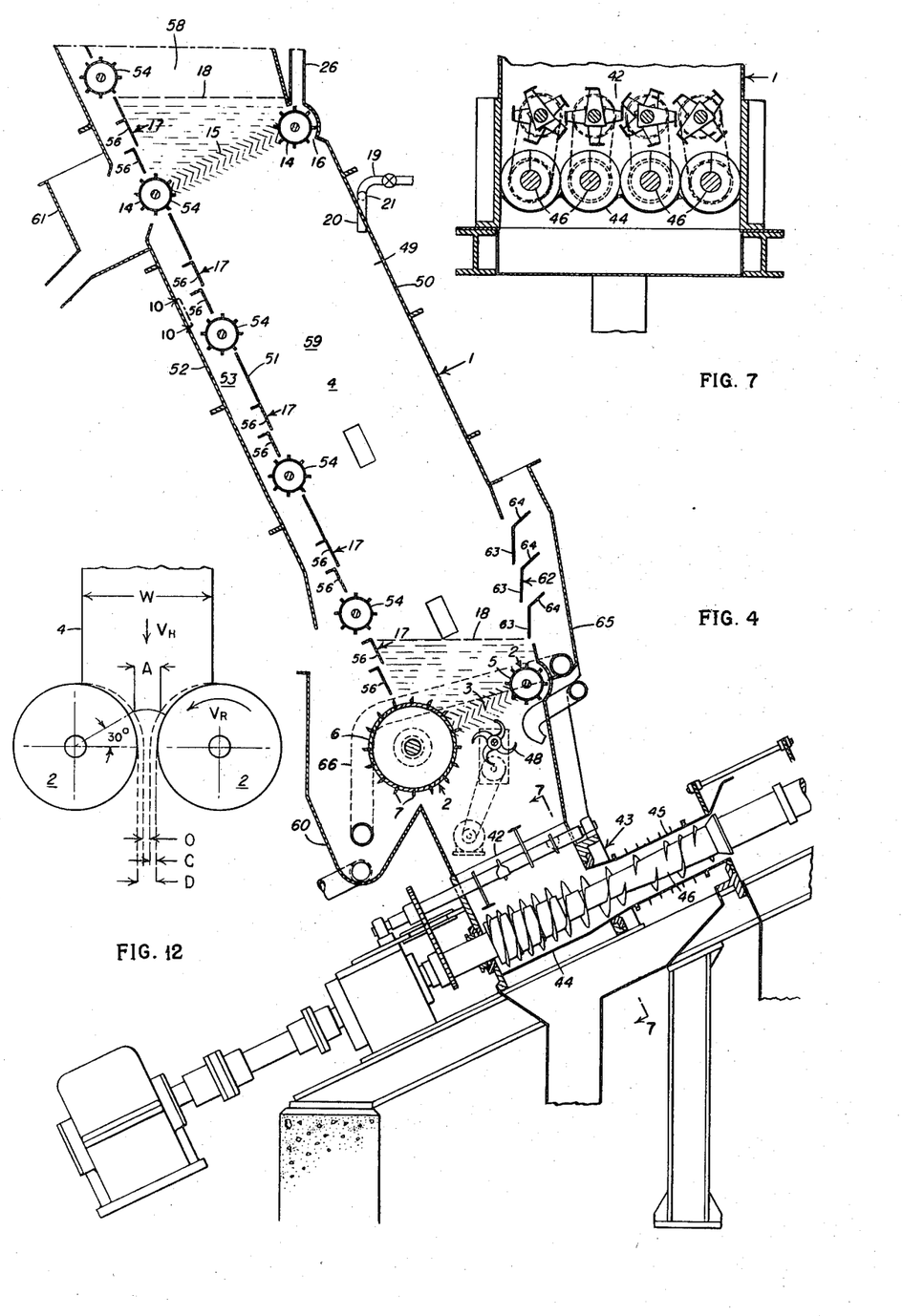
FIG. 7 is a fragmentary vertical sectional view taken along lines 7—7 of FIG. 3.
FIG. 12 is a diagrammatic view showing the effect on the pressure exerted between a pair of pinch rolls of projecting the rolls into the bagasse column for supporting part of the weight of the overlying bagasse.
Figures 5, 8, 9:
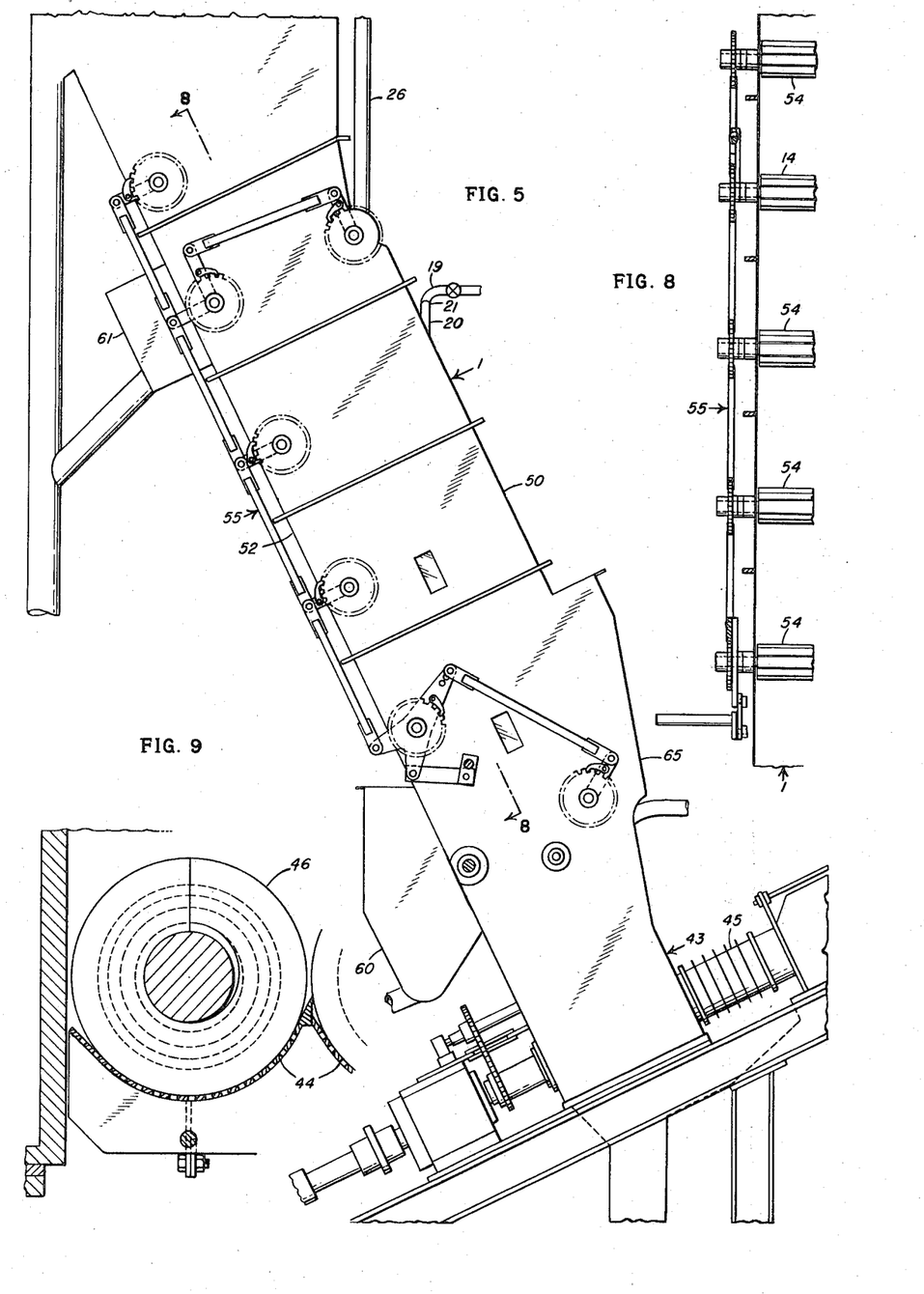
FIG. 5 is a fragmentary side elevational view of the lower part of the structure of FIGS. 3 and 4.
FIG. 8 is a fragmentary vertical sectional view taken along lines 8—8 of FIG. 5.
FIG. 9 is a fragmentary view on the section of FIG. 7 and an enlarged scale, showing in more detail the construction of the lower part of the feed hopper of the screw press.
Figure 6:
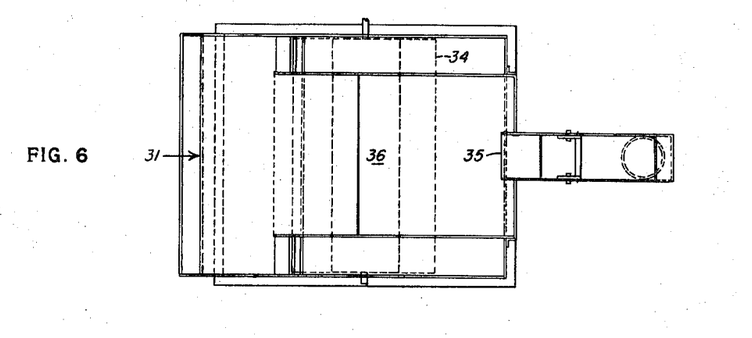
FIG. 6 is a fragmentary plan view of the structure of FIG. 3.
Figure 11:
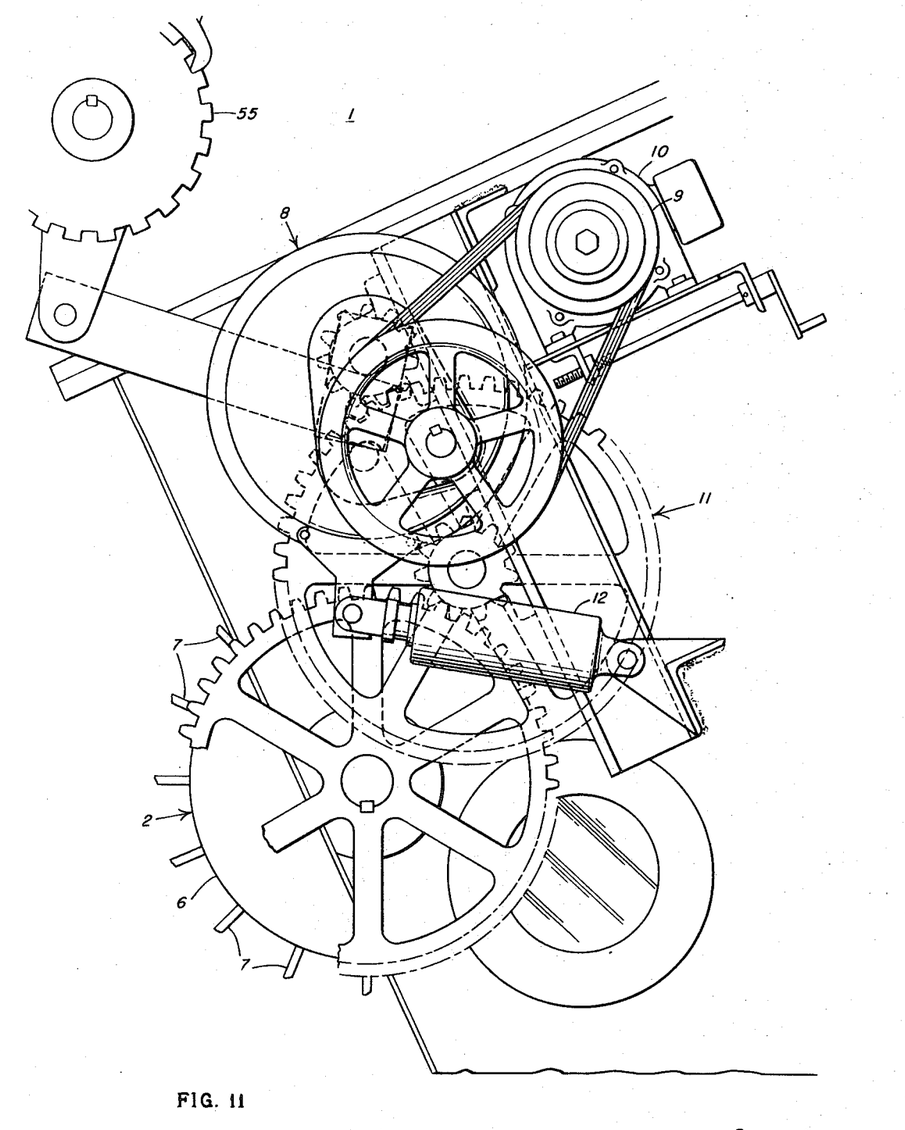
FIG. 11 is a side elevational view on an enlarged scale of the drive for the rolls in the hopper.

As illustrated in the diagram of FIG. 12, the solution to the above problem is to project one or each roll 2 into the bagasse column or, more precisely, the path of the column, to the point where a substantial part of the weight of the overlying bagasse is supported on the upper surface of the roll. Even when, as here, the overlying bagasse is very wet, it can be supported on a portion of a roll surface presented thereto contained in an arc extending about 60° on either side of the vertical. Consequently, a roll presenting such a surface portion to the overlying bagasse will reduce by so much the width of the overlying column effective or acting between the rolls, the reduction in the diagram of FIG. 12 being from the total width "W" to the effective width "A." A surprising corollary of the partial roll support of the overlying column is that in its presence narrowing of the space between the rolls will decrease rather than increase the pressure between the rolls and, correspondingly, the power required to drive them. This is because the bagasse supported on the rolls, instead of adding to the force therebetween, simply is fed by the rolls into the intervening space. Thus, with the "D" representing the space between the rolls, the compression of the rolls on the bagasse moving therepast is reduced by the partial support of the overlying bagasse on the rolls from $W/D$ to $A/D$.

In addition to the above symbols, in the diagram of FIG. 12 "$V_H$" represents the downward velocity of the overlying bagasse column under the force of gravity, "$V_R$" the roll velocity, "C" the part of "D" at each side filled by the bagasse fed from the upper surfaces of the rolls, and "O" the remainder of "D," and the following equations apply:

$$\text{Column feed} = 2 \times V_R \times C + V_H \times A$$
$$= V_H \times W$$

Then $$V_H \times W = 2 \times V_R \times C + V_H \times A$$

and $$V_H = \frac{2 \times V_R \times C}{W - A}$$

Assuming the following values:
W=50"
$V_R$=1200" per min.
A=11"
D=6", and
C=2"
and substituting these values of $V_R$, C, W and A in the last equation:

$$V_H = \frac{2 \times 1200 \times 2}{50 - 11} = 133''/\text{min.}$$

On the same assumptions, the relative values of the ascribed volume between the rolls and the column feed are, respectively:

$$V_R \times D = 1200 \times 6 = 7200$$

and $$V_H \times W = 129 \times 50 = 6150$$

This shows that by partly supporting the overlying bagasse column on the rolls and preselecting the variables, the pressure between the rolls can be reduced to a negligible value, at which the bagasse passing between the rolls will be in loose condition. Since the roll spacing D can be reduced and the bagasse compressed to less than ½", partial support of the overlying bagasse on the rolls renders it entirely feasible to produce by the rolls a liquid impermeable plug or layer of tight bagasse and, therebelow, extrude bagasse from the container in loose condition, with only slight or relatively low pressure exerted between the rolls and correspondingly low power requirements.

As in the diagram of FIG. 12, each of the illustrated containers or hoppers 1 depends on partial roll support of the overlying bagasse for minimizing the pressure and power required for discharging bagasse from the container and conveniently uses the same pair of counter-rotating rolls 2 for forming a liquid impermeable plug of tight bagasse, designated as 3, for retaining liquid thereabove in the container. However, in contrast to the rolls of the diagram, the illustrated pair of opposed combined discharge and pinch rolls 2 are of different size or diameter. Both rolls project into the bagasse column or mat, designated as 4, for presenting thereto an upper surface portion partly supporting the column above the rolls and both preferably are radially toothed for facilitating movement of the supported bagasse into the nip or space between the rolls. Although their positions can be reversed, here, the smaller roll 5 is disposed at the front and the larger 6 at the back of the column, with the former entirely contained in and the latter partially in the container. The rolls suitably turn about parallel, horizontal axes and, although both preferably are power driven, in the illustrated apparatus the larger back roll 6 controls the rate of discharge of the bagasse.

Constantly driven during operation of the apparatus and termed a carding drum for the carding-like defelting or separating action of its radial teeth 7 on the bagasse passing thereover, the larger rear roll 6 is adapted automatically to balance the output and input of bagasse and thus maintain the height of the bagasse column 4 in the container 1 within predetermined limits by driving it by a variable speed drive 8. Suitably, the drive 8 includes a varipulley 9 driven by an electric motor 10 and connected through a reduction gear train 11 to the larger roll or carding drum 6, with the pulley controlled in its effective diameter by a fluid-actuated control cylinder 12. In turn, the cylinder 12 is responsive through a conventional power positioner (not shown), such as made by the Foxboro Company, to the angular position or angularity of a sensor or probe rod or arm conveniently pivotally suspended in the container above and engageable with the top of the bagasse column. With the "set point" of the power positioner adjustable so that the sensor rod 13 will be at a predetermined angularity or obliquity when the top of the column 4 is at and its height reaches the desired normal level, swinging of the rod up or down in response to changes in that level will cause the speed of the carding drum 6 to be respectively increased or decreased from normal by changing the effective diameter of the varipully 9 and, by correspondingly varying the rate of discharge of the bagasse from the container 1, return or restore the column to the desired height.

Moved downwardly by gravity through the container 1, with both its rate of discharge and downward movement controlled by the carding drum 6, the column of disintegrated bagasse, as it moves through the container, is washed with diluent liquid for extracting juice. In washing juice from the bagasse, diluent liquid is introduced or injected into and excess liquid containing extracted juice is withdrawn or removed from the container 1 at different levels or vertically spaced positions, with the injection the higher to compensate for the effect of gravity on the washing liquid as it moves through the column and also the latter's downward movement.

For efficient extraction, the container should be tall, a height of somewhere around 30 feet usually being satisfactory, and the extraction performed in a plurality of stages at different levels. Also, the stages should be separated, so that each covers a predetermined or definite part of the height or length of the bagasse column, and the pinch effect, used in the bottom portion of the container to restrain discharge of liquid with the bagasse, is particularly adapted to produce the desired separation. Consequently, in the preferred apparatus, the bagasse column 4 is pinched, by roll means acting externally and laterally on the column, at a plurality of vertically spaced points or positions, each at the bottom or outlet end of one of the stages.

For the illustrated embodiment in which two washing stages are performed in the container 1, the preferred pinch means for separating the stages is a second or upper pair of opposed, counter-rotating pinch rolls 14, spaced upwardly from or vertically above the lower pair 2 and spaced by and acting on opposite sides of the column. As in the case of the lower pair, the upper pair 14 projects into the column and, by reducing the column's cross-sectional area therebetween, applies thereto the relatively slight or low pressure required to change the bagasse from the permeable springy mat state best suited for the washing in the overlying stage into an impermeable upper plug or thin layer 15 of tight bagasse for preventing or restraining the liquid in the upper stage from passing with the bagasse into the lower stage.

As in the rinsing hopper of Farmer Pat. No. 3,432,344, the washing action of the diluent liquid in each stage is produced by rinsing and for the most part cross-rinsing of the interposed bagasse as the liquid flows between an injector 16 for introducing diluent liquid into the upper portion of the stage and a drain screen 17 therebelow in a lower portion of the stage above the adjoining pair of pinch rolls 2 or 14. However, in the present container the plugs 3 and 15 at the bottoms of the stages have the salutary effect of causing part of the liquid in each stage to accumulate above its plug in a pool 18. As explained in Appel Pat. No. 3,248,262, counter-movement of a column of bagasse and water or other diluent liquid will produce an interface or interzone therebetween of progressively increasing juice concentration away from the diluent liquid and thereby enable juice to be extracted by displacement and, specifically, hydraulic displacement from ruptured or "killed" cells of the oncoming bagasse in the column. Since the conditions required for such displacement are met by the downward movement of the column and the liquid pool in the bottom portion of each stage, in the present container juice is adapted to be extracted from the bagasse in each stage not only by rinsing but also by displacement, so that the washing in each stage actually is a combination of rinsing and displacement with corresponding increase in the efficiency of the extraction.

The contemplated washing or combined rinsing and displacement requires that the juice in the juice-containing cells in the bagasse be exposed to the action of the diluent liquid. For the most part the juice exposure is obtained by preliminary disintegration in advance of the container 1, in which the sugar cane is suitably crushed or cut and shredded for rupturing juice-containing cells. However, rupture of 100% of the cells is practically impossible on a commercial scale and above about 90% is disproportionately expensive. It therefore is desirable to limit the preliminary disintegration to cell rupture of this lower order, but this is not feasible unless the bagasse is somehow further treated to make the juice in the unruptured cells available for extraction. Although aided by some other effects, the effect or further treatment mainly relied on for exposing the juice in the remaining unruptured cells to extraction by diluent liquid is heating or hot soaking.

The walls of unruptured cells can be killed and rendered permeable to flow therethrough of diluent liquid and juice by heating them to an elevated temperature in a range of from about 170° to about 190° F. Wherefore, if, following the disintegration, the bagasse is heated to a temperature within the "kill" range, practically all of the juice in the bagasse is made available for extraction by washing. While the bagasse can be heated within the container 1 by preheating the diluent liquid, it has been found more efficient to heat the bagasse by injecting or introducing steam directly into the bagasse column in the container. To contain the steam, the injection conveniently is made between adjoining pairs of pinch rolls, such as the illustrated upper and lower pairs 14 and 2. While, at the start, only the bagasse and liquid directly exposed to the steam will be heated, after a short period of operation, usually about one hour, all of the bagasse and liquid in the container can be brought to and held in the "kill" range by appropriately regulating the rate at which the steam is injected. As in the illustrated embodiment, the steam preferably is injected into and across the width of the column by an injector 19 having a plurality of laterally spaced inlet nozzles or pipes 20 connected to a common external header 21 and projecting therefrom through an adjoining wall of the container and into a side of the bagasse column at a suitable downward angle. The injected steam not only heats the bagasse to kill walls of unruptured cells, but, by "cooking," softens the bagasse for easier pressing in any subsequent pressing operation.

Using the pinch effect, the container 1 not only enables juice to be extracted from disintegrated bagasse by both rising and displacement, but, by separating the stages, also permits the bagasse to be subjected to a far larger quantity or volume of diluent liquid than is possible in diffusion apparatus, with consequent drastic reduction in the relative time required for extraction. The desired large quantity of diluent liquid is impractical to produce by a single pass of liquid through each stage but is readily produced by continued recirculation, with the withdrawn liquid becoming richer in juice in each stage but, as reintroduced, still less rich in juice than the bagasse subjected to it. The recirculation conveniently is accomplished by pumping diluent liquid into the container from a recirculating or juice tank 22, suitably by a rotary chokeless pump 23, and returning most of the liquid drained from the particular stage to the tank. So long as the diluent liquid is sufficiently dilute in juice, the same tank can be used for both the upper and lower stages of the illustrated container and the juice therefrom can readily be divided or apportioned as desired between the stages by pumping it into a liquid feed box 24 on a side of the container and having an adjustable weir 25 for flow of diluent liquid thereover into the container, preferably above the top of the bagasse column 4, and a feed pipe 26 leading downwardly to the upper portion of the second stage below the upper pair of pinch rolls 14. Since richer in juice than that from the lower stage, depending on its richness, part of the liquid withdrawn from the upper stage can be diverted either to a boiler house through a product pipe 27 or to some earlier stage of extraction for which its juice concentration is appropriate.

On reaching a juice extraction plant in which the improved apparatus is installed, sugar cane will be cleaned to remove at least the larger particles of foreign matter and then disintegrated, as by crushing or cutting and shredding, to rupture juice-containing cells before being fed to the container 1. If desired, the disintegrated cane or bagasse can be fed directly to the container from the disintegrating means, here represented by a shredder 28, using a suitable elevator to lift the bagasse to the required height. However, for maximum flexibility in the relative locations of the disintegrator 28 and container 1 and minimum consumption of both floor space and power, as well as to add a preliminary washing stage, it usually will be preferred to discharge the disintegrated bagasse from the disintegrator into a slurry tank 29 and there mix the bagasse with diluent liquid into a slurry or slurry mixture containing somewhere on the order of about 3% solids. In that liquid state, the bagasse can readily be pumped over any desired horizontal and vertical runs, suitably by a variable speed rotary chokeless, so-called sludge, pump 30.

Whatever the state in which it is fed to the container, the bagasse, during washing therein, should be in the permeable springy mat solid state. Consequently, if the bagasse is fed as part of a liquid slurry mixture, the bagasse must be reconverted to the solid state by draining off the excess slurry liquid before being fed or introduced into the container. This is accomplished by feeding the slurry mixture to a screening device at the upper end of or surmounting the container and, for its high efficiency and capacity, the preference is a screening device for liquid-solid mixtures of the type disclosed in my co-pending application Ser. No. 133,785, filed Apr. 14, 1971. As in that application, the preferred screening device 31 has an arcuately concave, stationary drain screen 32 so vertically curved as to drain liquid from a slurry mixture moving downwardly therealong by both gravity and centrifugal force. The drain screen 32 terminates downwardly in a direction-reversing, up-turning or upwardly curved lip 33, giving it the name "ski jump" drain screen. A rotary brush 34, turning in the bottom portion of the screen, 32, both assists the drainage and brushes or cleans the now solid state bagasse off the screen over the lip 33 and feeds it into the upper portion of the container for movement by gravity theredown as part of the bagasse column.

On reaching the screening device 31, the slurry is applied under pressure to the upper portion of the screen through a preferably adjustable nozzle 35 and flaring of the nozzle and an intervening downwardly sloping flume 36, cause the slurry to impinge at a suitable downward angle against the screen as a thin stream of substantially the screen's width, with the impact force driving part of the liquid through the screen and the remaining slurry mixture downwardly therealong. Liquid drained from the mixture through the screen drains into a sump 37 and, since the drain holes 38 in the screen can be as much as about 7/16" in diameter without pith escaping therethrough, due to the filtering action of the fiber in the bagasse, any sand and mud not previously removed is free to drain off with the liquid and collects as sediment in the bottom of the sump. The bulk of the drained liquid is continuously removed from the sump 37, separately from the sand and mud, and returned for recirculation to the slurry tank 29 through a discharge or drain pipe 39 opening into the sump within the liquid level but above the sediment level, and the sand and mud are periodically and preferably automatically discharged from the bottom of the sump by suitable valving (not shown) on accumulating therein to the predetermined sediment level.

In the illustrated container 1 the diluent liquid in all stages is injected into one side of the bagasse column 4 and the excess liquid and extracted juice is withdrawn wholly from the opposite side in the upper stage and partly therefrom in the lower stage. In such case the quantity of diluent liquid addable in the upper or first stage is quite limited if the top of the bagasse column is either level or slopes downwardly toward the injection side but much greater if the column top, instead, slopes downwardly toward the withdrawal side. The preferred screening device 31, in addition to its excess liquid draining and sand and mud cleaning functions, readily enables the disintegrated bagasse fed into the container to accumulate therein in a column having the desired downward slope toward the rear at the top, simply by positioning the drain screen 32 to direct the bagasse discharged therefrom onto the top of the bagasse column at the injection side thereof. This causes the bagasse to pile up on that side and slide down therefrom at its angle of repose toward the opposite side. Also, the upturned lip 33 at the discharge end of the drain screen dissipates the driving force of the rotary brush 34 in forcing the brush to drive the bagasse upwardly toward the injection side. Thus, the downward movement of the bagasse from the screen to the top of the column is only under the force of gravity and the fibers as they reach the column are loose and free to slide downwardly toward the opposite side.

Figures 1, 2, 10:
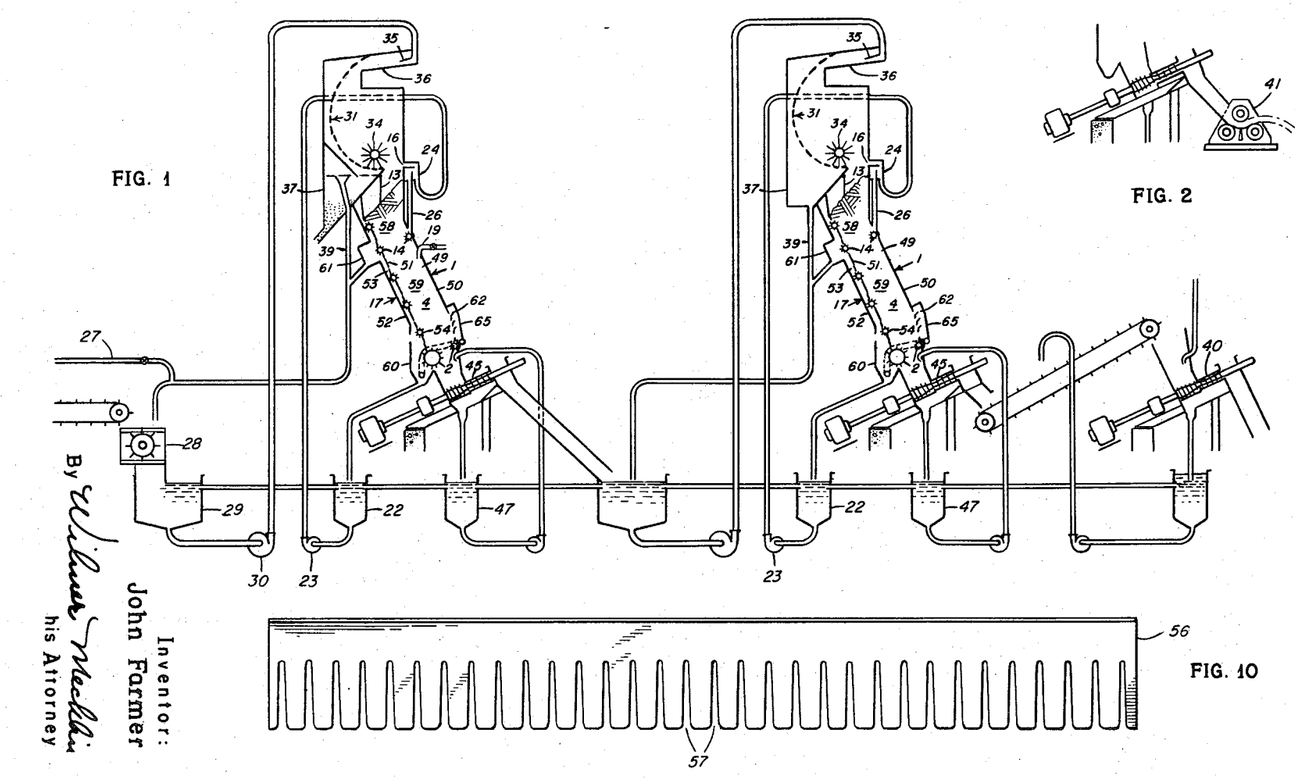
FIG. 1 is a somewhat schematic longitudinal sectional view of a preferred embodiment of the improved apparatus of the present invention in the plural hopper form in which it is self-sufficient in extracting juice from sugar cane.
FIG. 2 is a fragmentary longitudinal sectional view showing an alternate arrangement for the final drying of the bagasse.
FIG. 10 is a fragmentary sectional view on an enlarged scale taken along lines 10—10 of FIG. 4 and showing one of the slotted louvers forming the screens at the rear of the hopper.
Figure 3:
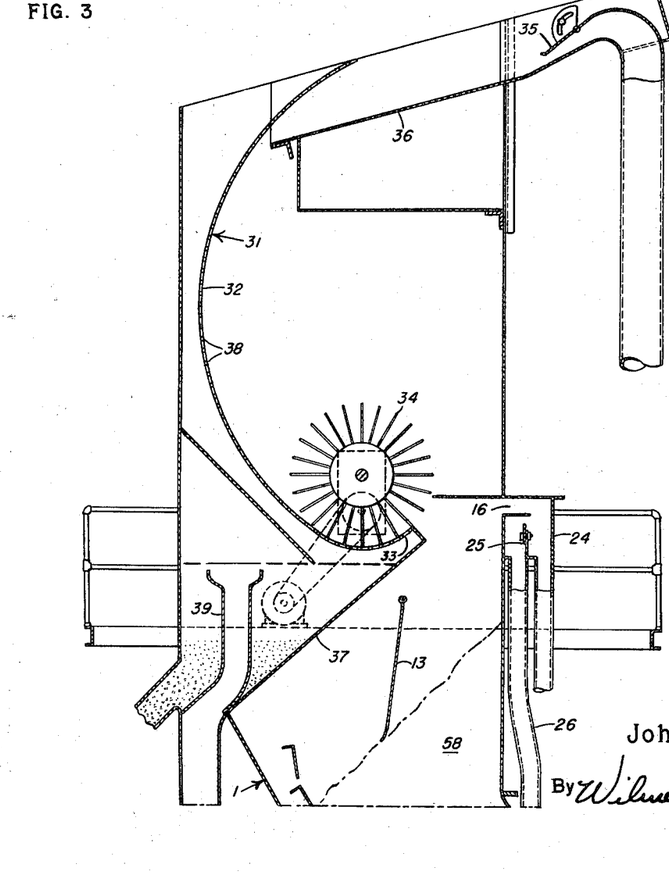
FIGS. 3 and 4 together are a view on the same section but an enlarged scale of one of the hopper and screw press assemblies of FIG. 1.

As illustrated in FIG. 1, the container 1 can be one of a plurality of like containers arranged in series or tandem and forming with associated equipment a complete, self-sufficient extraction apparatus of line capable of extracting some 98% of the juice initially contained in the sugar cane. In such complete apparatus the illustrated two containers usually will suffice and the bagasse discharged from the second can be reduced to a liquid or moisture content below 50%, suiting it for use as boiler fuel or for by-product extraction, by a suitable press such as the multibarrel screw press 40 at the end of the line of FIG. 1 or the roll mill 41 of FIG. 2. Additionally, a single container can be used for increasing the extraction obtainable by conventional extraction apparatus and is particularly adapted for use with a mill train by connecting it for processing bagasse between an adjoining pair of the train's roll mills or substituting it in the train for one or more of the roll mills. Depending on its use, the container thus may discharge bagasse into a succeeding or final press, directly or through an intervening slurry tank to a succeeding container, or to an intermediate press positioned at the container's bottom for reducing the liquid content of the discharged bagasse before it is further processed. Of these alternatives, the third has the advantage not only of expressing additional juice in the course of the pressing, but also of enabling the bagasse to be subjected to an additional or third stage of washing, in this case by rinsing, by discharging it into a feed hopper 42 of an associated intermediate press 43 and withdrawing or draining the excess liquid through a foraminous bottom 44 of the feed hopper.

As exemplary of a press suitable for an additional washing stage, the illustrated intermediate press 43 is a plural barrel screw press, such as disclosed generally in Farmer Pat. No. 3,432,344 and specifically in my copending application Ser. No. 65,447, filed Aug. 20, 1970. As in that patent and application, bagasse received in the common feed hopper 42 is driven therefrom through and extruded from a plurality of barrels by a plurality of screws 46 in the bottom portion of the hopper and each extending through one of the barrels. The additional washing stage is obtained by injecting diluent liquid into the discharged bagasse below the lower pinch rolls 2 and draining the excess liquid containing extracted juice through the foraminous bottom 44 of the feed hopper 42 into an underlying juice tank 47 individual thereto for recirculation from the tank through the bagasse. If, as in the illustrated embodiment, the lower pinch rolls and discharge rolls are the same and the intermediate press is a plural-barrel screw press, a desirable accessory is a multi-bladed cutter 48 turning on a horizontal axis parallel to those of the rolls and positioned below and between the rolls in the path of the mat of bagasse extruded thereby for cutting up the mat and preventing the bagasse from falling in clumps into the feed hopper 42.

In the foregoing respects the upright container 1 preferably will be the same whether it is vertically or obliquely disposed. However, for better control of the flow of liquid through the bagasse column 4, it usually will be preferred that the container be oblique and incline or slope downwardly toward the front or side in which the diluent liquid is injected and also that the container be generally rectangular in cross-section. The main problem the preferred oblique disposition poses is that, if permitted simply to slide along the container, the bagasse at the back of the column will tend to bridge or consolidate on the underlying surface and thereby produce slip planes within the column that, by causing channelling, will obstruct the flow of liquid therethrough. Also, in following a sloping path, the bagasse at the back of the column is prone to clog the drains or drain screens 17 through which excess liquid containing extracted juice is withdrawn from the washing stages. To overcome these problems, the bagasse column, in passing through the preferred sloping container 1 to the discharge rolls 2, is contained in or restricted to a passage 49 bounded at the front by the container's front wall 50 and at the back by an intermediate wall 51.

Spaced forwardly from the container's rear wall 52, with the intervening space forming a liquid discharge passage 53, the intermediate wall 51 has vertically or longitudinally spaced therealong a series of transport rolls 54, an upper of which conveniently is the rear roll of the upper pair of pinch rolls 14. All preferably radially toothed for better engagement with the bagasse column 4 and projecting forwardly thereinto from the intermediate wall 51, the transport rolls 54, as well as the front rolls of the pairs of pinch rolls 2 and 14, suitably are intermittently driven in a downward direction relative to the bagasse column by a ratchet drive 55 driven off the gear train 11 of the drive 8 for the carding drum 6 and capable of free wheeling in a downward direction either between drives or when, under the control of the continuously driven carding drum 6, the bagasse column is moving downwardly more rapidly than the speed at which they are driven. So driven and free wheeling, the transport rolls 54 effectively prevent the bagasse at the back of the column from bridging on the intermediate wall 51 and on each drive thereof, by slightly compressing the part of the column presented thereto, have a pulsating effect, which, by producing correspondingly intermittent surges in the liquid flowing through the column, increases the efficiency of the washing. Due largely to the partial support of the overlying bagasse on the combined discharge and pinch lower rolls 2 and the consequent low power required for controlling the rate of discharge of the bagasse, all of the rolls in the illustrated container can readily be driven by a mere 5 H.P. motor.

The second problem, the tendency of the bagasse at the back of the column 4 to plug the drains or drain screens 17 in the intermediate wall 51, through which the excess liquid flows into the liquid discharge or outlet passage 53, is solved by forming each screen of a pair or plurality of relatively staggered or stepped drain louvers or louver plates 56 extending the width of the intermediate wall and each serrated or slotted over its lower portion by laterally spaced slots 57 opening downwardly onto and tapered upwardly from its lower edge. By staggering the louvers of each drain screen so that any upper louver is spaced forwardly from and longitudinally, vertically or downwardly, overlaps the adjoining or succeeding lower louver, the excess liquid is free to pass through the slots 57, while the bagasse of the back of the column is forced to slide downwardly along the louver and in process clean the slots.

In effect divided by the upper pinch rolls 14 into an upper zone 58 for the first washing stage and lower zone 59 for the second washing stage, the bagasse passage 49 must have sufficient drainage in each zone to handle the liquid withdrawn from that stage and the drainage in each may be at one or more levels so long as it is below the level at which the diluent liquid for that stage is injected. Thus, for the relatively short upper stage, a single rear drain screen 17 in the intermediate rear wall 51 over the lower portion of the upper zone 58 suffices, while for the longer lower zone 59 more drainage is needed and provided mainly by a plurality of vertically spaced rear drain screens 17, each conveniently positioned above one of the rear rolls in that zone, including both the transport rolls 54 and carding drum 6, and these drains lead collectively through the liquid outlet passage 53 and a rear sump 60 at the bottom thereof to the juice or recirculating tank 22.

Since the liquid drained from the first stage is richer in juice, in the illustrated embodiment only part of that liquid is drained to the common juice tank 22, while the balance is diverted to the slurry liquid discharge pipe 39 through a collection box 61 mounted on the back of the container 1 adjacent the upper pinch rolls 14 and opening forwardly onto the liquid outlet passage 53. Additionally, for improved control of the liquid content of the lower zone 59, as well as to ensure an adequate supply of liquid in the displacement pool above the lower plug 3, the lower zone 59 preferably has a front drain 62. As opposed to the rear drains 17, the front drain 62 suitably is formed of a plurality of vertically or longitudinally spaced and overlapping solid angle plates 63 extending through the container's front wall 50 and having therebeyond upwardly sloping or inclined outer legs 64 leading to a front sump 65. With their outer legs 64 so sloping, liquid must accumulate thereon to the height thereof before it can flow thereover into the front sump 65. The liquid so accumulated thus is available to maintain the lower liquid pool 18 at the desired level, while any liquid drained into the front sump drains therefrom into the rear sump 60 through a connecting pipe 66. Also, the compressive action of the lower pinch rolls 2 can be assisted by a gravity-imposed wedging action on the column 4 by sloping the lower portion of the front wall 50 rearwardly toward the rear wall from a point above the front drain 62, so that the lower portion of the container 1 is downwardly tapered or wedge-shaped.

In operation, the container 1 and associated equipment have a processing cycle or retention time of about 7 to 10 minutes, and can process disintegrated bagasse of the usual around 15% fiber content at a rate as high as about 250 tons per hour. Using a conservative input rate of about 125 tons per hour as exemplary and mixing the bagasse in the slurry tank 29 with diluent liquid in the ratio of about 400 tons of liquid to 100 tons of bagasse to produce a slurry or slurry mixture having the preferred fiber content of about 3%, some 3,000 g.p.m. of slurry will be pumped to the screening device 31. Of that quantity about 2,500 g.p.m. is drained through the drain screen 32 and the remaining, now solid, begasse is fed into the upper end of the container 1.

Moving downwardly by gravity in the container 1 as a column 4 controlled in its height and rate of movement and discharge by the carding drum 6, the bagasse within the container it washed in the permeable springy mat solid state in upper or first and lower or second washing stages, performed, respectively, in the upper and lower washing zones 58 and 59, with large quantities of recirculated diluent liquid. The total liquid for the two stages is about 200 tons for each 100 tons of input bagasse or, for the exemplary input, around 1,000 g.p.m. and for stages of the illustrated relative lengths, this total will be divided by the adjustable weir 25, usually in the proportions of 1/5 for the first stage and the balance for the second. In the preferred third stage performed on the bagasse as it is discharged from the container 1 into the feed hopper 42 of the intermediate press 43, the quantity of diluent liquid recirculated will be less than the total of the first and second stages and usually about 100 tons per 100 tons of input bagasse.

Reduced to a liquid content of about 55 to 60% by the intermediate press 43, the bagasse in the complete extraction apparatus of FIG. 1, is discharged from the press to the second container 1 through the latter's slurry tank 29, and subjected to a second washing cycle similar to the first, but with the introduced diluent liquid more dilute as befits the then lower juice content of the bagasse. As previously noted, the bagasse from the intermediate press 43 at the bottom of the second container will usually be dried by a further press 40 or 41 in a final pressing stage to a liquid content of less than 50% for use as a fuel or by-product extraction and in this final drying stage can be subjected to a final rinsing with the diluent liquid the water introduced into the apparatus.

Whether introduced in the final pressing or earlier, the initial water will flow or move through the apparatus, counter the movement of the bagasse, as diluent liquid progressively richer in juice, with the liquid input and output balanced by withdrawing the richest liquid at a suitable rate through the product pipe 27. The quantity of water introduced into the apparatus is small relative to the quantities of diluent liquid with which the bagasse is washed, about 30 tons per 100 tons of input bagasse usually sufficing. Of this quantity about half will be discharged with the final bagasse, while the balance will be withdrawn as product juice with the juice from the input bagasse. Capable of extracting about 98% of the juice, the apparatus thus will produce, from input bagasse of about 15% fiber content, about 100 tons of rich juice per 100 tons of input bagasse.

As it moves through each container and the equipment associated therewith, the bagasse is subjected to a variety of washing effects, including scrubbing and rinsing in the preliminary slurry stage, rinsing, displacement and hot soaking to kill unruptured cells in the stages within the container, scrubbing and rinsing in the stage performed with the feed hopper 42 and scrubbing and squeezing in the intermediate press 43. As a consequence, the extent of the preliminary disintegration for rupturing juice-containing cells is less critical than in extraction by diffusion in which the effect is primarily rinsing, usually assisted by preheating the diluent liquid. The preliminary rupturing for extraction by washing in the apparatus of this invention should be somewhat over 90%, but, even though the difference may seem small, this is much simpler and less expensive to obtain than the very precise preliminary disintegration required in diffusion extraction for rupturing over 94% of the juice-containing cells. There also is a very definite time advantage over diffusion extraction, the latter ordinarily requiring somewhere around 45 minutes, while the apparatus of FIG. 1 can extract at least as much juice, about 98%, in a total processing time of about 17 minutes, with a retention time in each container 1 in the preferred range of about 7–10 minutes. Too, as indicative of its efficiency, a single container 1 or the first in a series, with the preferred associated equipment, can extract about 90% of the juice in around 8 minutes, in which time diffusion apparatus can extract only about 50%.

From the above detailed description it will be apparent there has been provided improved apparatus for extracting juice from disintegrated sugar cane, which is capable of use in plural container form as a complete extraction line and in single container form with conventional extraction apparatus for increasing the efficiency of the extraction. It should be understood that the described and disclosed embodiment is merely exemplary of the invention and that all modifications are intended to be included that do not depart from the spirit of the invention and the scope of the appended claims.

Having described my invention, I claim:

1. Apparatus for extracting juice from sugar cane, comprising an upwardly disposed downwardly discharging container for receiving sugar cane previously disintegrated into bagasse for rupturing juice-containing cells thereof, means for feeding said bagasse into an upper portion of said container for movement theredown by gravity as a column, means for washing said bagasse in said container with diluent liquid to extract juice therefrom, and roll means acting externally on said column for controlling the rate of gravity discharge of said bagasse from said container and restraining discharge of free liquid therewith.

2. Apparatus according to claim 1, wherein the washing means include means for injecting diluent liquid into a side of the bagasse column adjacent a top thereof and drain means in the container at an opposite side of said column from and a lower level than said injecting means for draining excess liquid from the column, and the feeding means feeds the bagasse onto the top of the column at the liquid injecting side thereof for thereby causing said top of the column to slope downwardly toward the liquid drain side of said column at substantially the angle of repose of the bagasse.

3. Apparatus according to claim 1, wherein certain of the roll means are constantly driven during operation of the apparatus for controlling the rate of discharge of the bagasse, and including means for sensing the height of the bagasse column in the container, and variable speed drive means for driving said certain roll means and responsive to said sensing means for varying the speed at which said certain roll means are driven and thereby the discharge rate of the bagasse as necessary to hold the height of the column within predetermined limits.

4. Apparatus according to claim 3, wherein the sensing means include a sensor rod swingably suspended in the container above and normally engaging a top of the bagasse column and changeable in angular disposition thereby in response to changes in the column height.

5. Apparatus according to claim 1, wherein the roll means include pinch roll means in the container for pinching bagasse moving therepast into a plug substantially impermeable to free liquid.

6. Apparatus according to claim 5, wherein the washing means include spaced means for respectively injecting diluent liquid into and draining excess liquid from the container in advance of the pinch roll means, said liquid in part flowing through the bagasse for extracting juice therefrom by rinsing and in balance forming a pool on the inlet side of the plug for extracting juice by displacement from the bagasse moved through the pool.

7. Apparatus according to claim 1, wherein certain of the roll means project into and partly support the weight of the bagasse column for reducing relative to non-supporting roll means the pressure exerted thereby on bagasse moving therepast.

8. Apparatus according to claim 7, wherein the certain roll means are pinch roll means in the container for restraining discharge of free liquid with the bagasse by compressing the bagasse moving therepast into a plug substantially impermeable to said liquid.

9. Apparatus according to claim 8, wherein the roll means are a pair of opposed rolls in the container and acting on opposite sides of the bagassee column, said rolls cooperate for pinching the bagasse moving therebetween into the liquid-impermeable plug, and at least one of the rolls is constantly driven during operation of the apparatus and controls the rate of discharge of the bagasse.

10. Apparatus according to claim 1, including means for injecting steam directly into the bagasse column for heating the bagasse and liquid in the container to a temperature in a range of from about 170° to about 190° F. and thereby killing walls of unruptured juice-containing cells of the bagasse for free passage of liquid therethrough.

11. Apparatus according to claim 10, including a plurality of longitudinally spaced pinch roll means in the container and each acting externally on the bagasse column for pinching bagasse moving therepast into a plug substantially impermeable to liquid, and wherein the steam injecting means projects through a wall of the container and into an adjoining side of the bagasse column between adjoining of said pinch roll means and at a downward angle relative to the column.

12. Apparatus according to claim 11, including means for recirculating through each stage at least part of the liquid drained therefrom.

13. Apparatus according to claim 1, wherein the feeding means includes means in advance of the container for mixing the disintegrated bagasse with diluent liquid into a slurry mixture, screening means mounted on the container above the upper portion thereof, and pump means for pumping said slurry mixture to said screening means, said screening means including a drain screen for draining excess liquid from the mixture and feeding the drained bagasse in a solid state into the upper portion.

14. Apparatus according to claim 13, wherein the drain screen drains any mud and sand from the slurry mixture with the excess liquid, and the screening means includes means on a drain side of the screen for separating the mud and sand from the excess liquid.

15. Apparatus according to claim 13, wherein the drain screen is a downwardly directed vertically curved screen along a concave face of which the slurry mixture moves downwardly by gravity and is subjected to gravity drainage, said screen terminates downwardly in an upwardly curved portion for additionally draining liquid from said mixture by centrifugal force, and said screening means includes a rotary brush turning in said upwardly curved portion for brushing drained bagasse therefrom into the upper end portion of the container.

16. Apparatus according to claim 15, wherein the screening means includes adjustable nozzle means in advance of the drain screen for impacting the slurry mixture at a downward angle against an upper portion of the concave face thereof and driving part of the excess liquid through and the remaining mixture downwardly along the screen.

17. Apparatus according to claim 1, wherein the bagasse in moving downwardly as a column through the container is washed therein in a plurality of stages at different levels, the washing means includes spaced means for respectively injecting diluent liquid into and draining excess liquid from each stage, and including pinch means in the container between any adjoining stages for separating said stages by pinching bagasse moving therepast into a plug substantially impermeable to free liquid and thereby restraining said liquid from discharging with bagasse from one to a succeeding stage.

18. Apparatus according to claim 17, wherein the roll means including a radially-toothed carding drum below the last washing stage in the container for discharging bagasse therefrom, said drum projecting into and partly supporting the weight of the bagasse column, and including a variable speed drive constantly driving said drum during operation of said apparatus and varying the speed thereof in response to the height of the bagasse column for maintaining the height within predetermined limits by controlling the rate at which the bagasse is discharged by said drum.

19. Apparatus according to claim 18, wherein the carding drum is in the container, and the roll means include a roll in the container at an opposite side of the bagasse column from the drum and cooperating therewith for pinching bagasse discharged therebetween into a liquid-impermeable plug.

20. Apparatus according to claim 17, wherein the roll means include pinch roll means in the container at the bottom of the last washing stage therein, and the pinch means are pinch roll means spaced above the first-named pinch roll means.

21. Apparatus according to claim 20, including press means adjacent a bottom of the container and having a feed hopper for receiving bagasse discharged therefrom, and wherein the washing means includes diluent liquid injecting means in the container below the roll means and excess liquid draining means in a bottom of said feed hopper for extracting additional juice from the bagasse discharging from the container by subjecting said bagasse to a stage of washing by rinsing.

22. Apparatus according to claim 21, wherein the press means is a screw press having a plurality of barrels, and a plurality of screws in a bottom portion of the feed hopper each for driving bagasse therefrom through one of said barrels, and including rotary cutting means in the container below and in the path of bagasse discharged as a mat by the roll means for cutting up said mat in advance of the feed hopper.

23. Apparatus according to claim 20, wherein the liquid in each stage in part flows through the bagasse for extracting juice therefrom by rinsing and in balance forms a pool on the inlet side of the plug at the bottom of said stage for extracting juice by displacement from the bagasse moved through the pool.

24. Apparatus according to claim 23, including a weir box mounted externally on said container through which diluent liquid is fed to a plurality of the washing stages therein, and an adjustable weir in said box for dividing said diluent liquid in a predetermined ratio between such stages.

25. Apparatus according to claim 20, wherein the container is of generally rectangular cross-section and obliquely disposed with a downward slope toward the front, and including a correspondingly disposed open-ended passage in the container laterally containing the bagasse column moving therethrough and bounded at front and rear by front and rear walls, and a plurality of transport rolls in the container and spaced along said rear wall for preventing bagasse at the rear of the column from consolidating thereon.

26. Apparatus according to claim 25, wherein the roll means include discharge roll means driven constantly during operation of the apparatus and having a variable speed drive responsive to changes in the height of the bagasse column for varying the speed of the discharge roll means as necessary to maintain the column height within predetermined limits, and including ratchet drive means driven off said drive for intermittently driving the transport rolls while permitting said rolls to freewheel in response to a higher rate of relative movement of the bagasse column.

27. Apparatus according to claim 25, wherein the roll means are a pair of combined discharge and pinch rolls in the container below the last washing stage therein and acting on the front and rear of the bagasse column for discharging bagasse therebetween from the container, at least one of said rolls is constantly driven at a controlled variable speed during operation of the apparatus for controlling the rate of discharge of the bagasse, and the rolls project into and partly support the weight of the column and pinch bagasse passing therebetween into a liquid-impermeable plug restraining discharge of free liquid from the last stage with the discharged bagasse.

28. Apparatus according to claim 25, wherein the container has a wedge-shaped lower portion extending above the pinch roll means at the bottom of the last washing stage for assisting the pinch action of said pinch roll means by applying a gravity-imposed wedging action to the bagasse column in advance thereof.

29. Apparatus according to claim 25, wherein the draining means for each stage includes at least one rear drain formed of a plurality of louvered drain plates interrupting and extending across the rear wall of the bagasse passage and each having a lower portion forwardly and downwardly overlapping any succeeding drain plate and interrupted by a plurality of laterally spaced slots opening downwardly onto and tapered upwardly from a lower edge thereof.

30. Apparatus according to claim 29, wherein there is one of the rear drains in advance of each roll at the rear of the column.

31. Apparatus according to claim 25, including an overflow drain in the front wall within the longitudinal limits of the last washing stage and above the pinch roll means at the bottom thereof for maintaining sufficient liquid in the last stage above said pinch roll means by accumulating up to a predetermined quantity of liquid at and exposed to the front of the bagasse column and draining liquid in excess of said quantity.

32. Apparatus according to claim 31, wherein the overflow drain includes a plurality of angle plates extending across and spaced longitudinally of the wall, each angle plate having an upwardly sloping outer leg extending forwardly beyond the front wall whereon liquid is accumulated and whereof excess liquid is drained, and including a front sump on the container beyond the front wall for receiving said excess liquid.

References Cited

UNITED STATES PATENTS

| | | | |
|---|---|---|---|
| 3,425,869 | 2/1969 | Farmer | 127—3 |
| 3,432,344 | 3/1969 | Farmer | 127—3 X |
| 3,501,345 | 3/1970 | Kaether | 127—3 X |
| 3,629,002 | 12/1971 | Kaether | 127—3 X |

MORRIS O. WOLK, Primary Examiner

S. MARANTZ, Assistant Examiner

U.S. Cl. X.R.

23—253 A, 270 R, 270 B; 100—126, 139; 127—5